United States Patent Office 2,713,569
Patented July 19, 1955

2,713,569

UREA-EPOXY COMPOSITIONS

Sylvan Owen Greenlee, Racine, Wis., assignor to Devoe & Raynolds Company, Inc., Louisville, Ky., a corporation of New York No Drawing. Application March 17, 1952, Serial No. 277,071

6 Claims. (Cl. 260—47)

This invention relates to new complex urea-epoxide compositions, and more particularly to such compositions capable of conversion into insoluble, infusible products, and valuable for use in making varnishes and protective coatings, in making molding compositions and articles, as adhesives, and in making films and fibres, etc. The invention includes various new urea-epoxy compositions and reaction products and articles and products made therefrom.

The new urea-epoxy compositions and products are made by reacting urea with complex epoxides produced by the reaction of polyhydric phenols with polyfunctional halohydrins or with polyepoxides to form complex reaction products containing terminal epoxide groups. Such epoxide products with which the urea is reacted are advantageously complex polymeric products resulting from the reaction of polyhydric phenols with polyfunctional halohydrins or polyepoxides in proportions to give terminal epoxide groups in the polymeric reaction products. Such complex epoxide products and compositions are described in my companion applications Serial Nos. 199,931 (now Patent No. 2,615,007); 250,951 (now Patent No. 2,615,008) and 626,449 (now Patent No. 2,592,560).

One of the objects of the present invention is the production of infusible and insoluble reaction products of complex epoxides and urea in suitable proportions which have remarkable chemical resistance combined with hardness, toughness, flexibility, lack of contraction on conversion, and other desirable properties.

Another object of the invention is the production of urea-epoxide compositions capable of use as raw materials for the production of such conversion products.

Another object of the invention is the production of urea-epoxide compositions which on conversion result in cross-linking of the complex epoxides through reaction of active hydrogens of urea with epoxide groups.

Another object of the invention is the production of fusible urea-epoxy compositions and reaction products useful for various purposes and still containing epoxy groups capable of further reaction.

Another object of the invention is the production of compositions and reaction products of polyepoxides with urea in proportions giving final infusible products of remarkable chemical resistivity and other desirable properties.

Another object of the invention is the production of solutions of such urea-epoxy compositions for use in making varnishes and protective coatings, impregnating solutions, films, filaments, etc.

Another object of the invention is the production of molding mixtures and compositions capable of conversion into infusible, molded articles and products, and the articles and products so produced.

Other objects of the invention and the nature and advantages of the invention will further appear from the following more detailed description.

In my companion applications Ser. No. 199,931 (now Patent No. 2,615,007) and 250,951 (now Patent No. 2,615,008), I have described complex, polymeric reaction products of polyhydric phenols with polyfunctional halohydrins such as epichlorhydrin and glycerol dichlorhydrin, with the difunctional chlorhydrin used in proportions in excess of that equivalent to the polyhydric phenol and less than twice the equivalent amount, by carrying out the reaction with the addition of caustic alkali equal to or somewhat in excess of the amount required to combine with the halogen of the halohydrin and giving complex, polymeric products containing both terminal epoxy groups and terminal primary hydroxyl groups, and with the epoxy groups in general considerably in excess of the terminal primary hydroxy groups. Such complex, polymeric epoxy-hydroxy products and compositions are advantageously used for reaction with urea to form the new urea epoxy compositions and products of the present invention.

In my companion application Serial No. 250,951 (now Patent No. 2,615,008) and in my Patent No. 2,582,985, I have described epoxy-hydroxy compositions resulting from the reaction of a polyhydric phenol with a polyfunctional halohydrin such as epichlorhydrin in approximate proportions of 2 mols of epichlorhydrin to one of dihydric phenol to give resinous products containing both terminal epoxy and hydroxy groups with the proportion of terminal epoxy groups considerably in excess of the terminal hydroxy groups. Such epoxy-hydroxy compositions are also advantageously used in forming the new urea-epoxy compositions and products of the present invention.

In my companion application Serial No. 626,449 (now Patent No. 2,592,560), I have described new polyepoxy products and compositions obtained by the direct addition of polyhydric phenols with polyepoxides and with the proportion of polyepoxides reacting with the polyhydric phenols in excess of the equivalent amount so that the resulting reaction products will contain terminal epoxy groups. Such polyepoxy reaction products, and particularly complex, polymeric, polyepoxy reaction products, are advantageously used in making the new urea-epoxy compositions and products of the present invention.

Such complex epoxides are polymeric polyethers of polyhydric phenols and particularly of dihydric phenols having alternating phenol residues and aliphatic groups, including hydroxyl-containing intermediate aliphatic groups and epoxide-containing terminal aliphatic groups and in general are free from functional groups other than hydroxyl and epoxide groups.

The complex epoxide compositions used with the urea are themselves capable of polymerization by reaction of epoxy groups with hydroxyl groups, particularly in the presence of small amounts of a catalyst. The complex epoxy compositions made from polyhydric phenols and epichlorhydrin contain both terminal epoxy groups and terminal primary hydroxyl groups and, in general, the number of terminal epoxy groups is considerably in excess of the number of terminal primary hydroxyl groups. In polymeric products containing intermediate hydroxyl groups, the total number of hydroxyl groups may be considerably in excess of the number of epoxy groups. Polymerization of such complex epoxy-hydroxy compounds may take place through terminal epoxy and primary hydroxy groups to form long chain polymers or through terminal epoxy groups and intermediate hydroxyl groups to form polydimensional polymers.

In the case of polyepoxides made by the direct reaction of bis phenol with an excess of polyepoxide there will also be hydroxyl groups, and, in the case of polymeric products, the number of hydroxyl groups may be in excess of the terminal epoxy groups. Such products are capable of polymerization by reaction of terminal epoxide groups with intermediate hydroxyl groups to form complex, polydimensional polymers, particularly when a catalyst is used.

When such complex epoxide compositions are reacted with urea, particularly when catalysts are used, the action may be one of the direct addition through epoxide groups and it may be in part the reaction of epoxy and hydroxyl groups to form ether linkages, particularly where the urea is used in less than equivalent proportion such that there is insufficient urea to react with all of the epoxide groups.

The complex epoxide compositions which are reacted with the urea are resinous products which can be made of varying melting points, epoxide content, and degree of polymerization from soft resins to harder resins of higher melting point. In general, these resins are soluble, unless too highly polymerized, in solvents such as acetone, methyl ethyl ketone, diacetone alcohol, cyclohexanone, etc. and can be used in solution with the addition of the urea with or without catalyst, as the case may be, in forming liquid compositions for use e. g. in making clear or pigmented varnishes, in making transparent films and filaments, and in impregnating wood, fabrics and other porous material, etc.

The reaction of the urea with such complex epoxides appears to be one of cross-linking the complex epoxide molecules through reaction of the urea with epoxide groups. But such cross-linking reaction may be combined with a simultaneous polymerization reaction between epoxide and hydroxyl groups, particularly when the urea is used in less than equivalent proportion.

When polyepoxides are reacted with the urea and where the polyepoxides contain only or mainly terminal epoxide groups with intermediate hydroxyl groups, the action of the urea is such that considerably less than the equivalent amount of urea will react with the polyepoxide to form infusible products; while the epoxide groups which are present in excess of those reacting with the urea may react to a greater or less extent with hydroxyl groups, in which case the complex epoxy-urea reaction product may have the polyepoxides united in part through urea cross-linking and in part through epoxy-hydroxide reaction to form ether linkages.

Similarly in the case of the complex polymeric epoxides which also contain terminal hydroxyl groups, the final hardening operation, particularly when less than the equivalent amount of urea is used, may be in part cross-linking through the urea and in part by polymerization through epoxy-hydroxy reactions to form ether linkages.

The complex epoxides and polyepoxides used for reacting with the urea may themselves be carried to a high degree of polymerization in which case only a small amount of urea may be necessary to convert the highly polymerized epoxides into an infusible state. With products of lower melting point and lower degree of polymerization an increased amount of cross-linking or polymerization in the presence of the urea, or a large proportion of urea, may be necessary to give the final insoluble product.

In referring to equivalent amounts of urea and of the complex polyepoxides, each active hydrogen attached to nitrogen of the urea is considered equivalent to one epoxide group. The equivalent weight of the urea is the weight which will contain one such active urea hydrogen when used with an equivalent weight of the complex epoxides containing one epoxide group.

The epoxide equivalent of the complex epoxides used can be determined for practical purposes by determining the equivalent weight of the composition per epoxide group.

The epoxide content of the epoxide-hydroxy compositions hereinafter indicated were determined by heating a 1 gram sample of the epoxide composition with an excess of pyridine hydrochloride (made by adding 16 cc. of concentrated hydrochloric acid per liter of pyridine) at the boiling point for 20 minutes and back titrating the excess pyridine-hydrochloride with 0.1 N sodium hydroxide using phenolphthalein as indicator, and considering the 1 HCl is equal to 1 epoxide group.

The following table gives illustrative examples of hydroxy-epoxy compositions resulting from the reaction of bis phenol with varying proportions of epichlorhydrin with the use of caustic soda according to said companion applications, the table giving the softening points of the resin, the equivalent weight to epoxide as determined by the above method, and the average molecular weight, in the case of the lower melting resins, as determined by the boiling point method.

| Example | Softening Point (Durrans Mercury Method), °C. | Equivalent Weight to Epoxide | Average Molecular Weight |
| --- | --- | --- | --- |
| I | 43 | 325 | 451 |
| II | 84 | 591.5 | 791 |
| III | 90 | 730 | 807 |
| IV | 100 | 860 | 1,133 |
| V | 121 | 1,248 |  |
| VI | 132 | 1,153 |  |
| VII | 146 | 3,155 |  |

The complex epoxides in this table were made from the reaction of bis phenol and epichlorhydrin in varying proportions with the use of aqueous caustic alkali sufficient to combine with all of the chlorine of the epichlorhydrin or somewhat in excess thereof. Other complex epoxides can similarly be made from other polyhydric phenols which are similarly capable of reacting with urea although the properties of the different complex epoxides will vary somewhat with different polyhydric phenols used and with different proportions of phenol and epichlorhydrin and with different degrees of polymerization.

*Example VIII*

A complex epoxide was prepared from 6 mols of hydroquinone and 7 mols of epichlorhydrin with 7.5 mols of aqueous caustic soda, which had a softening point of 92° C. and an equivalent weight to epoxide of 1105.

*Example IX*

An epoxide composition was prepared from 6 mols of resorcinol and 7 mols of epichlorhydrin with 7.76 mols of aqueous sodium hydroxide, which had a softening point of 80° C. and an equivalent weight to epoxide of 1146.

The foregoing examples illustrate complex epoxy-hydroxy compositions such as are described in my companion applications Serial Nos. 617,176 (now abandoned) and 621,856 (now abandoned). Likewise, complex epoxides may be prepared from the further reaction of such complex epoxy-hydroxy compounds with polyhydric phenols used in amounts less than that which is equivalent to the epoxide content. Thus the complex epoxides of Examples I to IX can be further reacted with limited amounts of polyhydric phenols to give complex epoxides of higher molecular weight which are useful in reactions with urea according to the present invention, such further reaction products being described in said companion applications.

The complex epoxides which are useful for reaction with urea also include complex polyepoxides such as are described in my companion application Serial No. 626,449 made by reacting polyhydric phenols with simpler polyepoxides to give complex polyepoxides. The simpler polyepoxides used for reacting with polyhydric phenols and urea include new polyepoxides more particularly described in Examples I and II of said companion application Serial No. 626,449 and which are briefly described in Examples X and XI.

Example X

The polyepoxide is produced by reacting 3 mols of glycerine with 9 mols of epichlorhydrin using boron trifluoride as a condensing agent and finally treating the resulting reaction product with sodium aluminate to give a polyepoxide in the form of a pale yellow product having an epoxide equivalent of 149 and an average molecular weight as determined by the standard boiling point elevation method of 324, representing an average of 2.175 epoxide groups per molecule, assuming the determined molecular weight is the molecular weight.

Example XI

A polyepoxide composition is similarly prepared from 1 mol of trimethylol propane and 3 mols of epichlorhydrin condensed with boron trifluoride and finally treated with sodium aluminate to give a pale yellow liquid having an equivalent weight to epoxide of 151 and an average molecular weight of 292.2, corresponding to approximately 1.94 epoxide groups per molecule, assuming an average molecular weight.

Other new polyepoxy products can similarly be made from other polyhydric alcohols containing 3 or more hydroxyl groups as described in said companion application Serial No. 626,449.

The preparation of new complex epoxides by the reaction of simpler polyepoxides with polyhydric phenols is illustrated by the following Examples XII to XVI.

Example XII

An epoxide composition was prepared by heating 0.3 mol of diglycid ether with 0.2 mol of bis phenol at 190–215° C. for 1½ hours to give a product softening at 89° C. and having an equivalent to epoxide of 1460.

Example XIII

To 29.8 parts of the product of Example X was added 11.4 parts of bis phenol and this mixture was heated gradually to 173° C. and held at 162–173° C. for 2 hours. The resulting product was a viscous, tacky syrup having an epoxide equivalent of 479.

Example XIV

To 4.6 parts of bis phenol and 4.3 parts of diglycid ether was added 0.032 part of 20% sodium hydroxide and the resulting mixture heated for 45 minutes at 100° C. to give a semisolid material containing one epoxide group per 371 parts.

Example XV

To 7.5 parts of p,p'-dihydroxy diphenyl sulfone and 7.5 parts of diglycid ether was added 0.006 part of sodium hydroxide and the resulting mixture was heated for 86 minutes at 100° C. to give a product containing 1 epoxide group per 315 parts.

Example XVI

To 50 parts of the product of Example XI was added 19 parts of bis phenol and the resulting mixture was heated for 2 hours and 10 minutes at 162 to 186° C. to give a soft tacky resin having an epoxide equivalent of 440 and a molecular weight of 828.

The foregoing Examples I to XVI, inclusive, illustrate various complex epoxides which can be reacted with urea in making the new urea-epoxy compositions. The following examples illustrate the production of such compositions from the complex epoxides of the foregoing examples.

Example XVII

A mixture of 1158 parts of the product of Example VI and 60 parts of urea was heated for 1 hour at 150° C. and gave an infusible product.

Example XVIII

A mixture of 315 parts of the product of Example XV and 30 parts of urea was heated for 1 hour at 100° C. This mixture was dissolved in methyl ethyl ketone to give a 75% solution. After adding 1 part of potassium hydroxide, 0.003 inch films were spread and baked ½ hour at 110° C. to give flexible products.

Example XIX

To 32.5 parts of the product of Example I was added 6 parts of urea and the mixture was heated with stirring to obtain a clear solution. This solution, on further heating at 150° for 30 minutes, gave an insoluble, infusible product.

Example XX

To 32.5 parts of the product of Example I was added 6 parts of urea and the mixture was heated with stirring to obtain a clear solution. To this solution was added 1.15 parts of sodium phenoxide and the reaction mixture was heated at 150° C. for 30 minutes to give an insoluble, infusible product.

Example XXI

The epoxide resin was similar to that of Example IV above but had a softening point of 110° C. and an equivalent weight to epoxide of 1001. To 20.2 parts of this resin was added 0.6 part of urea. After heating and stirring to obtain a clear solution, the mixture was held at 150° C. for 30 minutes and gave an insoluble, infusible product.

Example XXII

To 20.2 parts of the same resin as used in Example XXI was added 0.6 part of urea. After heating and stirring to obtain a clear solution, 0.1 part of sodium phenoxide was added and the mixture was heated at 150° C. for 30 minutes to give an insoluble product.

Example XXIII

To 325 parts of the resin of Example I was added 33 parts of acetamide and the mixture heated for three hours at 200° C. to give a product softening at 86° C. To 16.25 parts of this product was added 1.5 parts of urea. After heating and stirring to obtain a clear solution, the reaction mixture was held at 150° C. for 30 minutes and gave an insoluble product.

Example XXIV

To 30 parts of the product of Example IV was added 0.15 part of phthalimide. This reaction mixture was heated at 150° C. for 1½ hours and then at 200° C. for 3 hours. The product was a resin melting at 107° C. To 21 grams of this product was added 0.3 gram of urea and the mixture was held at 150° C. for 30 minutes to give a product which was a soft gel.

Example XXV

An epoxide resin similar to those above described and made by the reaction of bis phenol and epichlorhydrin and having a softening point of about 67° C. was used and 100 parts of this resin was dissolved in 67 parts of acetone. To this solution was added a solution of 4 parts of urea dissolved in a mixture of 8 parts of water and 12 parts of acetone with general warming. A homogeneous mixture was obtained. Sheets of glass cloth were dipped in the resulting mixture and were treated in a hot air oven for ten minutes at 95° C. The impregnated sheets were nontacky and contained about 33% of the urea-resin mixture.

A laminate containing 8 plies of superimposed glass cloth was prepared from the impregnated sheets. This assembly of 8 impregnated sheets was placed in a press having a platen temperature of 165° C. and subjected to contact pressure for 5 minutes, followed by pressing for an additional 5 minutes at 25 pounds per square inch. The resulting laminated product had a smooth surface and was a hard product of high strength.

The new urea-epoxide compositions have the advantage over oleoresinous varnishes and oil modified alkyd resins that the film thickness of protective coatings is not generally a factor in their conversion. Layers of a thickness which would no longer be classified as films, e. g., from ¼ to ½ inch, can be converted uniformly throughout the layer. Thus, one thick coat of the material may be applied where several thin coats of other types of film-forming compositions would be used.

The new compositions made with urea in suitable proportions thus form valuable protective layers and films when used either as clear varnishes or as pigmented varnishes, giving infusible films of remarkable resistance to chemicals and having other valuable desirable properties.

The new compositions are also valuable for use in making molded objects, where the conversion forms infusible, molded products. They are also valuable for use in impregnating and laminating wood and fabrics, in making self-sustaining films and filaments, etc.

Molded objects and films formed from the infusible products of the present invention have extremely hard, glossy surfaces but, nevertheless, in spite of their extreme hardness, the structure is remarkably tough and flexible. In the past it has been generally recognized that in order to obtain hard films (shellac films being an example) flexibility must be sacrificed; but the insoluble films of the present invention combine hardness with flexibility.

As an indication of the hardness and flexibility of the films made by the reaction of urea with the complex epoxides, extremely hard, infusible films on glass enabled ribbons of indefinite length to be stripped from a film from one to two mils thickness by the use of a sharp knife blade.

In general physical toughness and structure the infusible urea-epoxy resins are comparable to finger nail and horn.

When molded objects are formed by converting a mixture of the epoxy and urea in a mold no contraction has been observed and, in fact, a slight expansion was observed in some cases and reproducible results obtained. While I do not desire to limit myself by any theoretical explanation of the expansion of the resins on hardening, it may be the opening up of the epoxide groups through reaction with urea or the opening up of epoxide groups through reaction with hydroxyl groups to form ether linkages tends to cause separation of the reacting molecules instead of contraction which is characteristic of many condensation and polymerization reactions.

This lack of contraction of slight expansion in the mold is highly valuable for many applications, enabling tight fitting molded articles to be obtained. For example, brushes of many types are made by using a heat converting resin to cement the bristles into the brush ferrule. If the resin contracts during heat conversion the molded material becomes loose fitting in the ferrule. The new epoxide-urea resins and compositions of the present invention give a tight fitting mold within the brush ferrule. Similarly molded inserts can be made which are tight fitting when the composition is hardened in place.

The new infusible epoxide-urea reaction products give extremely glossy films when used as clears or as pigmented enamels. This is highly desirable in the protective coating industry to obtain desired amount of gloss, since it is often impossible to obtain such gloss when known vehicles are used.

The new urea-epoxide compositions may be pigmented with the usual pigments known to the protective coating industry to give enamels. The epoxide may be pigmented either before or after the urea is added.

The new epoxide-urea reaction products have been found to possess an extremely high adherence to glass, metal, wood and other surfaces, and these compositions can be used to advantage in the lamination of glass or metal, in the lamination of wood to form plywood or other laminated wood products, etc.

The new compositions, particularly when used in solution, are valuable impregnating compositions for surface coatings or for impregnating porous and fibrous materials such as fabrics and other porous and fibrous materials. It is one advantage of the new compositions that high concentrations can be used with a limited amount of solvent such that thick coatings are readily applied and the solvent readily removed, the hardening taking place in the film through chemical reaction without the formation of by-products, the chemical reaction being an addition reaction within the epoxy-urea composition itself.

This application is a continuation-in-part of my prior application Serial No. 632,595 (now Patent No. 2,589,245) filed December 3, 1945.

I claim:

1. Urea-epoxy compositions containing in substantial amounts complex resinous epoxides and urea, said complex resinous epoxides being polymeric polyethers of dihydric phenols, which dihydric phenols are free from functional groups other than phenolic hydroxyl groups, said resinous epoxides having a plurality of aromatic nuclei alternating with intermediate and terminal aliphatic chains united through ether oxygen, the aromatic nuclei being the hydrocarbon nuclei of the dihydric phenols, the intermediate aliphatic chains being alcoholic-hydroxyl-containing chains free from functional groups other than alcoholic hydroxyl groups and the terminal aliphatic chains having epoxide and alcoholic hydroxyl groups and being free from other functional groups.

2. Urea-epoxy compositions as defined in claim 1 which also contain an alkaline catalyst selected from the group which consists of alkali metal hydroxides and phenoxides.

3. The process of forming complex heat-hardened urea-epoxy reaction products which comprises heating the composition of claim 1 to a high temperature.

4. The process of forming complex heat-hardened urea-epoxy reaction products which comprises heating the composition of claim 1 to a high temperature together with an alkaline catalyst selected from the group which consists of alkali metal hydroxides and phenoxides.

5. Insoluble infusible reaction products resulting from the heating at high temperatures of the urea-epoxy compositions of claim 1.

6. Insoluble infusible reaction products resulting from the heating at high temperatures of the urea-epoxy compositions of claim 2.

No references cited.